Nov. 16, 1965 B. MASUR 3,218,635

CAPACITIVE ENCODER DEVICE

Filed Oct. 7, 1960 2 Sheets-Sheet 1

INVENTOR.
BERNARD MASUR
BY Henry L. Shenier
ATTORNEY

INVENTOR.
BERNARD MASUR
BY [signature]
ATTORNEY

United States Patent Office 3,218,635

Patented Nov. 16, 1965

3,218,635

CAPACITIVE ENCODER DEVICE

Bernard Masur, Brooklyn, N.Y., assignor to United Aircraft Corporation, East Hartford, Conn., a corporation of Delaware Filed Oct. 7, 1960, Ser. No. 61,198
6 Claims. (Cl. 340—364)

My invention relates to a capacitive encoder and more particularly to a device for storing information which overcomes the defects inherent in information storage and read-out devices of the type known in the prior art.

Various devices are employed in the prior art for storing information which may be read out in the form of electrical pulses. In one kind of device of the prior art the information is mechanically incorporated in a record in the form of coded electrical contacts which are mechanically engaged by brushes or the like as they move over the record medium to read the information contained therein. This device embodies all those defects which are inherent in devices in which mechanical contact must be made between relatively movable members. Owing to this mechanical contact, the contacting members wear relatively rapidly so that they have a short life. Not only is this true but also the contacts have a tendency to become dirty with the result that the information is not correctly read from the record.

Another type of information storage and read-out device employed in the prior art uses a magnetic medium which is magnetized in accordance with a predetermined pattern which represents the information to be stored. When the record is read, magnetic pickups which comprise coils are moved over the record to have voltages induced therein as they move over points on the record at which the record medium has been magnetized. These devices also embody a number of defects. First the record provided is not as permanent as is desired in many cases since the magnetized spots of the record may become demagnetized as when the record medium is subject to stray magnetic fields. As is also known, the magnetizable medium which carries the information cannot function satisfactorily in a location or an installation at which it may be subject to high temperatures. Owing to the fact that the pick-off or read-out devices of this system employ coils, they are relatively difficult to construct and hence are expensive. Magnetic reading devices employed in systems of this kind do not readily lend themselves to use with a record medium of an unusual configuration nor do they permit a compact system to be provided.

I have invented a capacitance encoder which overcomes the defects of information storage and read-out devices of the prior art pointed out hereinabove. The information stored by my device is permanently, mechanically incorporated in a record medium so that the information cannot be destroyed by the influence of strong temporary magnetic fields. The arrangement of my device is such that no mechanical contact is required between the read-out devices and the record medium. My device is able to operate at temperatures which are so high as to make a magnetic record system impracticable.

One object of my invention is to provide a capacitive encoder which overcomes the defects of information storage and read-out devices of the prior art.

Another object of my invention is to provide a capacitive encoder for storing information which may be read out without the necessity for mechanical contact between relatively movable members.

A further object of my invention is to provide a capacitive encoder in which information is permanently, mechanically incorporated so that it is not destroyed when the device is subject to strong temporary magnetic fields.

A still further object of my invention is to provide a capacitive encoder which can operate at temperatures which are so high that a magnetic storage device would be impracticable.

Yet another object of my invention is to provide a capacitive encoder which readily lends itself to unusual packaging configurations.

Other and further objects of my invention will appear from the following description.

In general my invention contemplates the provision of a capactive encoder in which spots or slugs of material having a substantially different dielectric constant than does the dielectric separating capacitor plates are arranged in a coded pattern. I move the slugs through the space between the plates of capacitors to vary the capacitance of the capacitors in accordance with the pattern to produce output pulses which represent the information embodied in the coded pattern.

In the accompanying drawings which form part of the instant specification and which are to be read in conjunction therewith and in which like reference numerals are used to indicate like parts in the various views.

Figure 1:
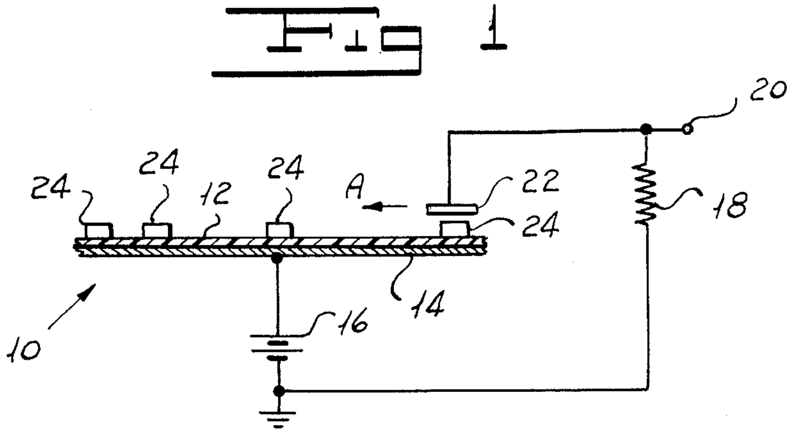
FIGURE 1 is a schematic view illustrating the principle embodied in my capacitive encoder.

Referring now to FIGURE 1 of the drawings, one form of my capacitive encoder, indicated generally by the reference character 10, includes a stationary member 12 such as a sheet, plate, or strip of a suitable insulating material, the undersurface of which carries a relatively heavy coat 14 of conductive material. I apply a potential to the coating 14 by connecting a battery 16 between the coating 14 and the ground. I connect a resistor 18 between ground and an output terminal 20. A capacitor plate 22 connected to the terminal 20 forms a capacitor with the coating 14 in series between terminal 20 and ground. I provide any suitable means such as will be apparent from the description given hereinafter for producing relative motion between the plate 22 and the insulator 12 carrying the coating 14. For example, I may move the plate 22 in the direction of the arrow A over the insulator 12.

I deposit spots or slugs 24 of conductive or dielectric material at predetermined spaced positions along the length of the insulator 12 so that as the plate 22 moves along the length of the insulator 12 it passes over some locations at which spots 24 are disposed and over other locations at which no spots are disposed. Any suitable conductive material such for example as silver, copper, or aluminum may be used to form the slugs or spots 24. Alternatively, I may empoly a dielectric material having a dielectric constant substantially different from that of the dielectric such as air separating the plate 14 and 22. Suitable dielectric materials are mica, glass, rubber, Bakelite, Formica, nylon, polyethylene and the like. It will be understood that where I employ a dielectric to form the slugs 24, I need not employ the insulator 12 but may use a conductive sheet 14. As is well known in the art, the amount of charge on a capacitor is determined by the relationship:

$$Q=CE \qquad (1)$$

where C is the capacitance and E is the voltage across the capacitor. As is also well known the capacitance of a parallel plate capacitor is expressed by the relationship:

$$C = \frac{kA}{d} \quad (2)$$

where A is the area of the two plates, $d$ is the distance separating the two plates and $k$ is the dielectric constant which in the case of air is substantially unity. Assuming that A and $k$ are constant, we may express the potential across the capacitor as:

$$E = \frac{dQ}{k_1} \quad (3)$$

where $k_1$ equals $k$A. It will be apparent from Equation 3 that the voltage across the capacitor can be varied by changing the dielectric constant or by changing the effective distance separating the plates. With plate 22 positioned over a location on insulator 12 at which no spot or slug 24 is disposed, a certain voltage will appear at the terminal 20. When a spot or slug 24 of conductive material is introduced between the plate 22 and the coating 14 as when plate 22 moves over a position at which a spot 24 is disposed, the effect is to decrease the effective length of the path between the two plates. Thus the voltage across the capacitor drops and a pulse of voltage appears at the output terminal 20. When a spot or slug 24 of a material having a dielectric constant greater than that of air is introduced between the plates, the potential across the capacitor decreases and a pluse of voltage appears at terminal 20. This pulse of output voltage is a function of the rate at which the plate 22 moves over the surface of the insulator 12. It is to be understood that, in the following description of the forms of my invention the spots or slugs may be formed of conductive or of insulating material, either of which results in a change in the voltage across the capacitor.

From the foregoing explanation it will be apparent to the Examiner that as the plate 22 moves in the direction of the arrow A over the surface of the insulator 12, a pulse will be produced each time the capacitor passes over a spot 24.

Figure 2:
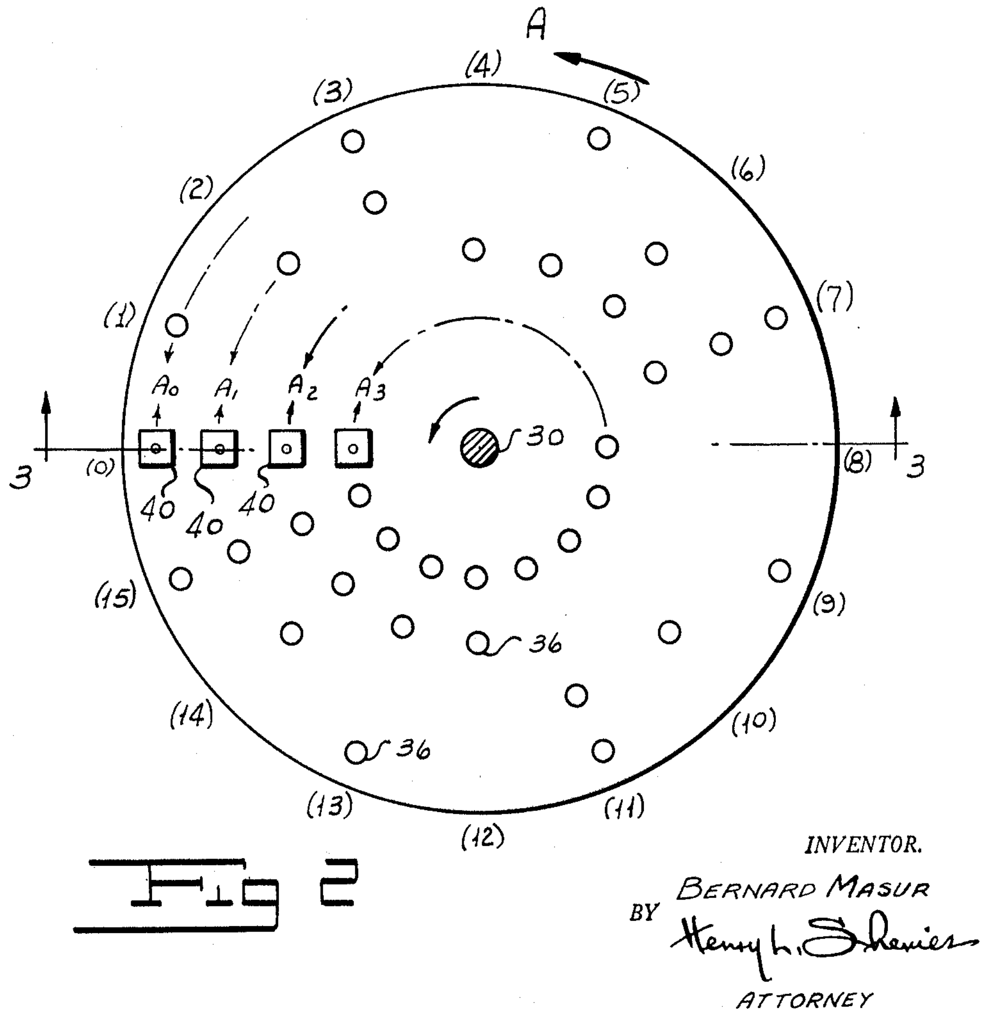
FIGURE 2 is a plan view of one form of my capacitive encoder.
Figure 3:
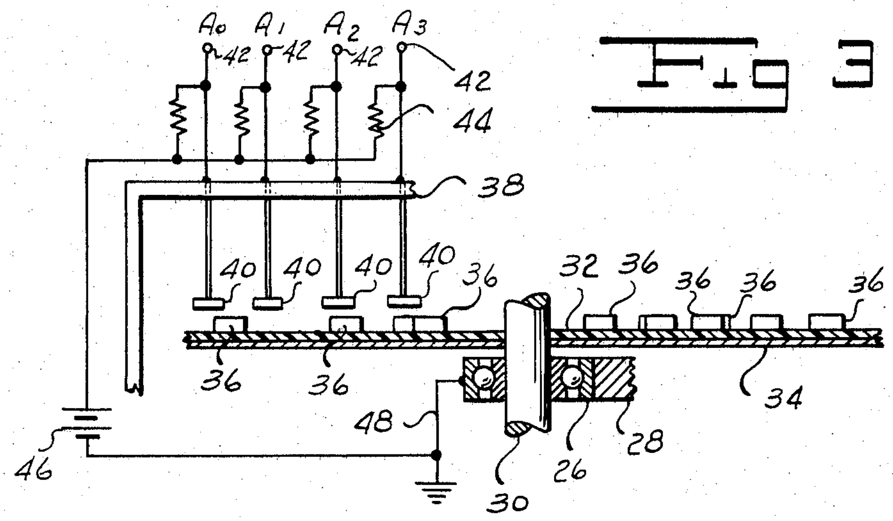
FIGURE 3 is a sectional view of the form of my capacitive encoder shown in FIGURE 2 taken along the line 3—3 of FIGURE 2.

Referring now to FIGURES 2 and 3, we have shown a form of our capacitor encoder which produces a pulse output representing the position of a shaft or the like from a reference position. In this form of my invention a bearing 26 carried by a stationary support 28 rotatably supports a shaft 30. Shaft 30 carries for rotation therewith a disk 32, formed of insulating material the underside of which is provided with a coating 34 of a highly conductive material. I place a plurality of conductive spots or slugs 36 of highly conductive material on the upper surface of the insulator 32 by any suitable means known to the art. For example, where I desire as an output a straight binary representation of the position of shaft 30, I may arrange the spots 36 in four circles in which $A_0$, $A_1$, $A_2$, $A_3$ represent the bits from least significant to most significant of a binary representation of shaft position.

A stationary support 38 carries a plurality of read-out capacitor plates 40 spaced along a radius so that each plate registers with one of the circles of spots so that the spots of a circle associated with a plate pass under the plate as the shaft 30 rotates. I connect each of the plates 40 to a respective output terminal 42. I connect respective resistors 44 between the output terminals 42 and one terminal of a battery 46, the other terminal of which is connected to ground. Conveniently, I connect the coating 34 to ground through shaft 30 and bearing 26 to a ground conductor 48.

From the structures thus described it will be apparent that as a spot 36 moves under its associated plate 40, a pulse is produced at the output terminal 42 connected to that plate. I have so arranged the spots 36 that as the shaft 30 moves in the direction of an arrow A in FIGURE 2 an output providing a binary representation of the numbers from 1 to 15 is produced at the output terminals 42. I have indicated the numbers represented by the spots at each position of the disk around the periphery of the disk shown in FIGURE 2. It will be understood, of course, that if the device is to be used as a shaft position encoder some means must be provided for preventing the output from being lost as the disk moves from one position to the next.

Figure 4:
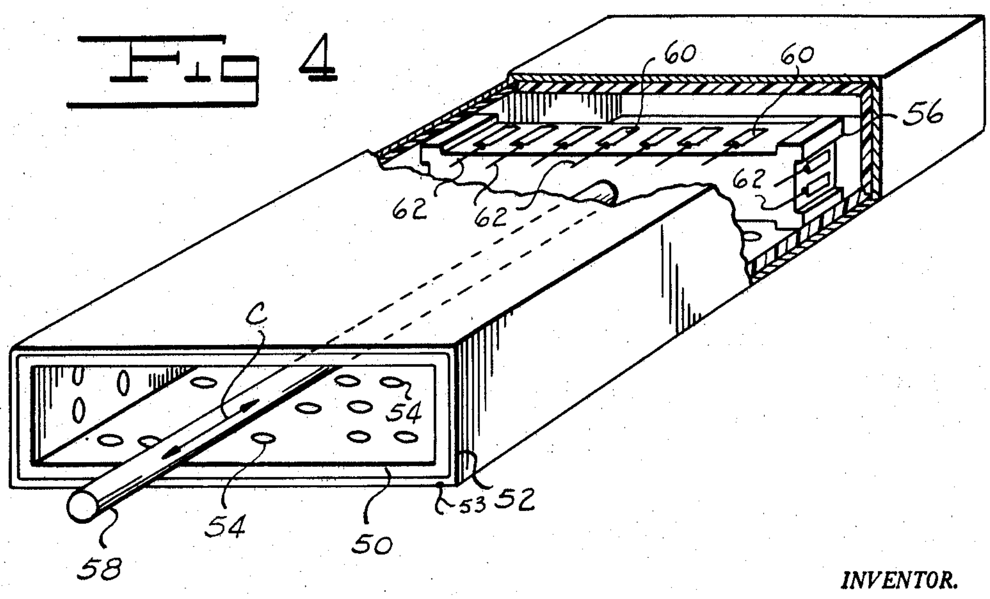
FIGURE 4 is a perspective view with parts broken away and with other parts shown in section of an alternate form of my capacitive encoder.

Referring now to FIGURE 4, I have shown yet another form of my capacitive encoder in which the outer surface of a hollow rectangular body 50 of a suitable insulating material is provided with a conductive coating 52 forming the common plate of a plurality of capacitors. A conductor 53 can be provided to permit electrical potential to be applied to coating 52. In this form of my invention I embed conductive spots 54 in a coded pattern in the insulator 50 making certain that the spots do not contact the conductive coatings 52. It will readily be understood that I could as well place the conductive spots 54 on the surface of the insulator 50 if I desire.

I dispose a plunger 56 formed of any suitable insulating material within the box-like structure of the insulator 50 and conductive coating 52 for movement in the direction of the axis of the structure. Conveniently, I secure a rod 58 to the plunger 56 to permit the plunger to be moved in and out with respect to the insulator 50 in the direction of the arrow C in the figure. I mount a plurality of capacitor plates 60 on the plunger 56 at points corresponding to the axially extending spaced lines of spot positions on the insulator 50. I connect a respective conductor 62 to each of the plates 60. It will readily be appreciated that the plates 60 and coating 52 have associated therewith external circuitry similar to that described in connection with the form of our invention shown in FIGURES 2 and 3. While I have shown this form of my invention as having a rectangular cross-section, it will readily be understood that I could as well make it cylindrical or any other desired configuration.

It will be appreciated that where I employ spots 24 of conductive material and a source of direct current potential such as a battery 16, these spots change potential as they enter the electric field between the plate 22 and the disc 14. This change in potential of the spot results from a current flow, however small, which produces an output at the terminal 20. When this is done the conductive spots need have no appreciable thickness so that they can readily be etched onto the carrier insulator 12 with a high degree of accuracy and there is no need to provide a plurality of electrical connections as is required in capacitive encoders of the prior art.

In operation of the form of my invention shown in FIGURE 1, as the movable capacitor plate 22 moves in the direction of the arrow A over the insulator 12 along a line of positions at which conductive spots or slugs may or may not be disposed each time the plate passes over a location at which a spot is positioned then a pulse appears at the terminal 20. Each pulse so produced has a magnitude which is a function of the speed at which the plate 22 moves over the spot. The pulses appearing at the terminal 20 will be in predetermined spaced relationship and may be applied to any device such, for example, as a high impedance counter which interprets the information embodied in the coded pattern of spots.

In the form of my invention shown in FIGURES 2 and 3, as the shaft 30 rotates in the direction of the arrow B shown in FIGURE 2 the circular rows of spots pass under the stationary read-out capacitor plates 40. As this occurs, there are successively produced at the output terminals 42 binary coded representations of the numbers from 1 to 15. It will be understood that in this arrangement some means should be provided for retaining one output representation until such time as the next radially aligned group of spots passes under the group of plates 40. In the form of my invention shown in FIGURE 4, as the rod 58 moves axially of the insulator 50, there are produced a plurality of outputs corresponding to the number of axially extending lines of spots 54. The pattern of spots may be any pattern which incorporates the desired information.

It will be seen that I have accomplished the objects of my invention. I have provided a capacitive encoder which does not require mechanical contact between the read-out elements and the information storage medium. The arrangement of my device is such that the information stored in the device is permanently, mechanically incorporated therein so as not to be affected by the application of strong temporary magnetic fields to the device. Owing to the fact that I need not employ windings in my device, it is relatively simple and inexpensive to construct as compared with magnetic read-out devices of the prior art. Since I do not employ magnetic material, my device can operate at temperatures at which devices which do employ magnetic material are entirely impracticable.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a capacitive encoder a pair of spaced capacitor plates separated by a dielectric, a plurality of discrete conductively isolated areas of material for altering the dielectric, means mounting said areas of material in a predetermined spaced relationship to one another in a coded pattern representing information and in conductively spaced relationship to both said plates, means for moving said mounting means to pass said areas of material through the space between said plates whereby to vary the capacitance between said plates as an area moves through the space between the plates, said mounting means comprising an insulator for mounting said areas on one of said plates and means responsive to said capacitance variation for producing an output representing the coded information.

2. In a capactive encoder a length of continuous insulating material, a conductive coating on one surface of said length forming a first capacitor plate, a plurality of discrete conductively isolated areas of conductive material carried by the other surface of said length of said insulating material, a second capacitor plate, means mounting said second capacitor plate in conductively spaced relationship to said conductive areas adjacent said other surface of said length, means for moving said second capacitor plate relative to said conductive areas to vary the capacitance between said plates and means responsive to said capacitance variation for producing an output signal.

3. A capacitive encoder including in combination a disk of insulating material, a coating of conductive material carried by said disk on one side thereof and forming a common capacitor plate, a plurality of discrete conductively isolated areas of conductive material on the other side of said disk, groups of said areas being disposed on the loci of respective concentric circles to form a coded pattern, respective second capacitor plates, means mounting said second capacitor plates in spaced relationship to said disk adjacent the other side of said disk and in conductively spaced relationship to said areas of conductive material to form capacitors with said common plate, said second capacitor plates being disposed on said mounting means at locations at which they register with the respective circles, means for moving said disk and said second capacitor plates relative to each other to vary the capacitance between said second plates and said common plate and means for deriving respective electrical signals in response to said capacitance variation.

4. In a capacitive encoder a pair of spaced capacitor plates separated by a dielectric, a plurality of discrete conductively isolated areas of conductive material, means mounting said areas of conductive material in predetermined spaced relationship to each other in a coded pattern representing information and in conductively spaced relationship to both of said capacitor plates, said mounting means comprising an insulator for mounting said areas on one of said plates, means for moving said mounting means to pass said areas of conductive material through the space between said plates whereby to vary the capacitance between said plates as an area moves through the space between the plates and means responsive to said capacitance variation for producing an output representing the coded information.

5. In a capacitive encoder a pair of spaced capacitor plates separated by a dielectric, a plurality of discrete conductively isolated areas of insulating material having a dielectric constant substantially different from that of the dielectric separating said plates, means mounting said areas of insulating material in predetermined spaced relationship to each other in a coded pattern representing information, means for moving said mounting means to pass said areas of insulating material through the space between said plates whereby to vary the capacitance between said plates as an area moves through the space between the plates and means responsive to said capacitance variation for producing an output representing the coded information.

6. In an encoding device a pair of spaced capacitor plates, a source of direct current potential, a circuit comprising an output terminal for applying said direct current potential across said plates, a plurality of discrete conductively isolated areas of conductive material, means comprising an insulator for mounting said areas on one of said plates in the area between said plates and in conductively spaced relationship to both said capacitor plates and means for moving said plates relative to each other to generate an output at said terminal.

References Cited by the Examiner

UNITED STATES PATENTS

| | | | |
|---|---|---|---|
| 1,580,112 | 4/1926 | Bone | 324—61 |
| 2,294,681 | 9/1942 | Moon | 235—61.116 |
| 2,460,511 | 2/1949 | Lang | 317—242 |
| 2,701,357 | 2/1955 | Newby | 340—345 |
| 2,925,590 | 2/1960 | Boltinghouse | 324—61.1 |
| 2,988,647 | 6/1961 | Duinker et al. | 340—166 |
| 3,011,156 | 11/1961 | MacPherson | 340—166 |
| 3,098,997 | 7/1963 | Means | 340—173 |
| 3,151,239 | 9/1964 | Lecroart et al. | 317—251 |

OTHER REFERENCES

Capacitor Storage Ring: IBM Technical Disclosure Bulletin; vol. 2, No. 3, October 1959; page 17.

NEIL C. READ, *Primary Examiner.*

IRVING SRAGOW, WILLIAM C. COOPER, *Examiners.*